Nov. 13, 1962  G. M. KIRKPATRICK  3,064,253
MONOPULSE RADAR SYSTEM
Filed Aug. 5, 1957  2 Sheets-Sheet 1
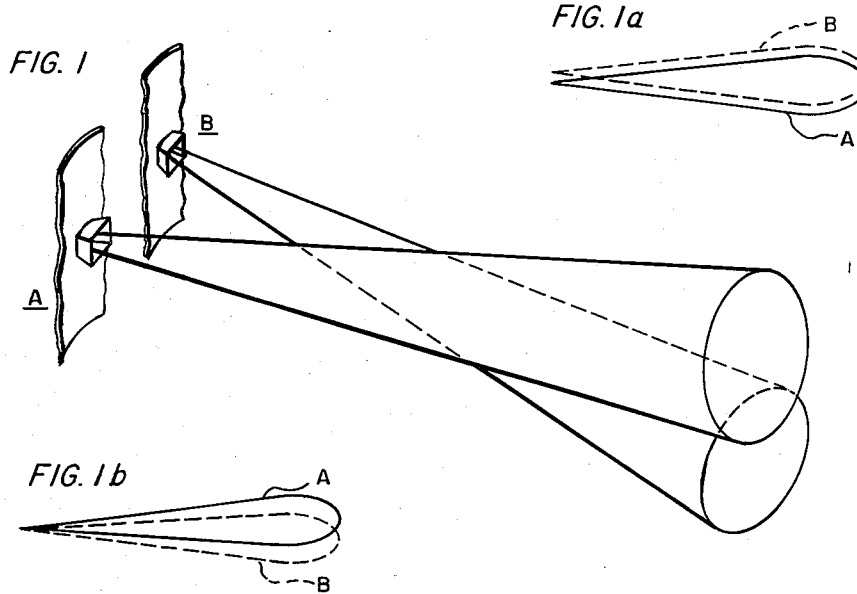
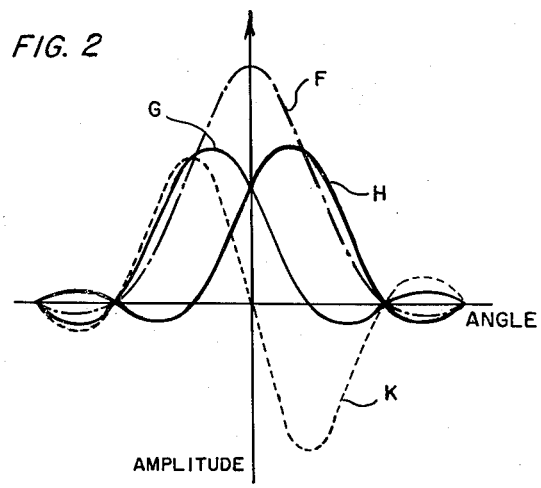
INVENTOR,
GEORGE M. KIRKPATRICK.
BY
ATTORNEY.

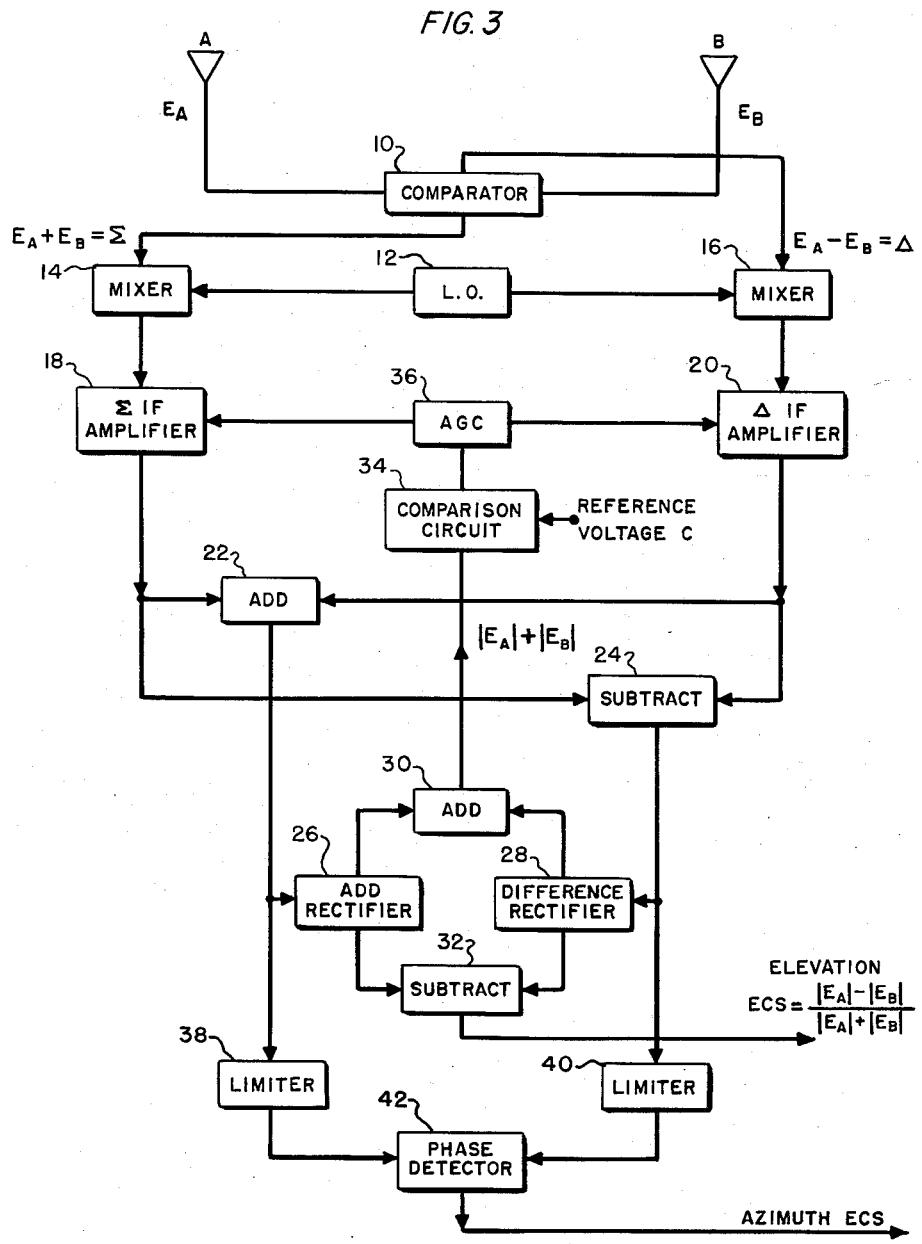

United States Patent Office 3,064,253
Patented Nov. 13, 1962

3,064,253
MONOPULSE RADAR SYSTEM
George M. Kirkpatrick, North Syracuse, N.Y., assignor to the United States of America as represented by the Secretary of the Army
Filed Aug. 5, 1957, Ser. No. 677,181
4 Claims. (Cl. 343—16)

This invention relates to radar tracking systems and more particularly to receivers adapted for use in monopulse radar systems.

In one type of monopulse radar system known as the combination amplitude-phase comparison system, phase comparison is used in the azimuth plane and amplitude comparison is used in the vertical or elevation plane. Such a system includes two antennas placed side by side in a horizontal plane but tilted, one up and one down, in the vertical plane. With such an arrangement position error correction voltage signals for targets at any point in the antenna beam are obtained in two dimensions. Since these position error correction signals, usually designated by the letters ECS, are a measure of the deviation of the target from the antenna boresight axis within the beam pattern, they should be independent of size and range of the target and also be linearly related to the target angle with respect to the boresight axis over a large portion of the antenna beam. For the combination amplitude-phase comparison system utilizing rectangular or square antenna apertures, it was found that when the elevation and azimuth error correction signals were derived from the ratio of the vector signal sum and difference antenna voltages, the linearity of the ECS in the amplitude comparison plane (elevation) was dependent on the phase angle separation of the antenna feeds along the horizontal axis. Because of this factor, elevation and azimuth error correction signals could not be used except for targets very close to the boresight axis of the antenna. Another factor which previously limited the use of elevation and azimuth error correction signals for targets very close to the boresight axis was that due to the presence of cross-talk.

It is therefore a primary object of the present invention to provide an improved monopulse radar system receiver wherein the error correction information from target signals on the elevation axis is made independent of the azimuth axis.

It is another object of the present invention to provide an improved monopulse radar system receiver wherein the error correction signals are independent of size and range of the target and, in addition, are linear over a relatively large portion of the antenna beam.

It is still another object of the present invention to provide an improved monopulse radar receiver wherein the effect of cross-talk in the elevation and azimuth error correction signal is greatly minimized.

Briefly, the present invention is directed to a means for deriving the elevation and azimuth error correction signals in a monopulse receiver system of the combination amplitude-phase comparison type wherein the two antenna radiation patterns are aligned in a horizontal plane but relatively displaced in a vertical plane. Included are means responsive to the combined antenna output signals for producing respective sum and difference vector signals and means for converting the sum and difference vector signals to respective sum and difference vector signals at a prescribed intermediate frequency. Also included are discrete amplifying means responsive respectively to the sum and difference vector IF signals. In addition, there is included discrete means for respectively adding and subtracting the amplified sum and difference vector IF signals whereby the respective antenna output signals are individually reconstructed, with the gain from the antenna outputs to the respective outputs of the adding and subtracting means being a prescribed value. Also included are means responsive to the respective outputs of the adding and subtracting means for deriving the absolute voltage value of the added sum and difference vector IF signals and the absolute voltage value of the subtracted sum and difference vector IF signals. Included further are discrete means for respectively deriving the arithmetic sum voltage and arithmetic difference voltage of the absolute voltage values. In addition, there is included means in circuit with the discrete amplifying means and responsive to the difference between a prescribed reference voltage and the arithmetic sum voltage whereby the arithmetic sum voltage is maintained substantially equal to the reference voltage. The arithmetic difference voltage is the elevation error correction signal. The azimuth error correction signal is derived by detecting the difference in phase between the vector IF outputs of the adding and subtracting means.

For a better understanding of the invention together with other and further objects thereof, reference is had to the following description taken in connection with the accompanying drawings in which:

FIG. 1 is a diagrammatic representation of the antenna radiation patterns in the combination amplitude-phase comparison monopulse system;

FIGS. 1a and 1b respectively illustrate the horizontal displacement and vertical squint of the antenna radiation patterns shown in FIG. 1;

FIG. 2 is a group of waveforms illustrative of the operation of the monopulse radar system and which is utilized in explaining the present invention; and FIG. 3 is a block diagram of a monopulse system in accordance with the present invention.

The antenna feed arrangement utilized in a combination amplitude-phase comparison monopulse system is shown in FIG. 1. Antennas A and B are side by side in the horizontal plane and point directly ahead. This makes the antenna radiation patterns identical in the horizontal plane though they are slightly displaced horizontally as shown from the top view in FIG. 1a. The two antennas are also tilted, one up and one down, in the vertical plane to give the antenna pattern the vertical squint shown in the side view, FIG. 1b. The space patterns in elevation of the antenna feeds are shown in curves G and H of FIG. 2. A target in space will reflect the echo pulse and the amplitude of the echo pulse can be predicted according to these space patterns. The sum of curves G and H is the curve F which indicates the amplitude sum of the echo pulse on either side of the boresight axis. The difference between curves G and H is shown in curve K, the negative amplitude portion indicating the phase reversal that takes place when the relative amplitudes at the antenna feeds changes on either side of the boresight axis. It will be seen that when an echo pulse is received from a point in the boresight axis, the amplitude of the difference signal is zero while the amplitude of the sum signal depends on the strength of the reflection. When an echo pulse is received from a point off the boresight axis but within the directive pattern, the sum signal still depends substantially only on the strength of the reflection. However, the amplitude of the difference signal depends both on the strength and on the deviation in the direction of the reflection from the boresight axis, and the phase relationship of the difference signal to the sum signal depends on the sense of the deviation; that is, the phases of the difference signal in response to a reflection from one side of the boresight axis is reversed with respect to that in response to a similar reflection from the other side of the boresight axis. By means of conventional duplex arrangements, antennas A and B are utilized for transmitting and receiving in a monopulse radar system. Assuming square or rectangular apertures for both feeds, it can be shown that the received vector quantities at the antennas for a target at any point in the beam pattern are $$E_A = \frac{E_r}{\sqrt{2}} F(\alpha/2, \epsilon, \epsilon_b) f(\epsilon - \epsilon_b) e^{-j\alpha/2} \quad (1)$$

$$E_B = \frac{E_r}{\sqrt{2}} F(\alpha/2, \epsilon, \epsilon_b) f(\epsilon + \epsilon_b) e^{j\alpha/2} \quad (2)$$

where:
$E_r$ = maximum signal at the receiver,
$\alpha/2$ is the lag and lead in phase of the signals at the two antenna feeds when the target is off the vertical axis of the system.
$\epsilon$ is the normalized elevation angle which is a function of the mechanical elevation angle and the antenna aperture height,
$\epsilon_b$ is the normalized antenna lobe squint in elevation from the antenna boresight axis,
$F(\alpha/2, \epsilon, \epsilon_b)$ is the antenna pattern in the form of a product solution for the combined apertures,
$f(\epsilon - \epsilon_b)$ is one antenna pattern in the amplitude (elevation) comparison plane, and
$f(\epsilon + \epsilon_b)$ is the other antenna pattern in the amplitude (elevation) comparison plane.

Thus, for any target within the beam pattern the vector quantities $E_A$ and $E_B$ as defined in Equations 1 and 2 are applied to a monopulse radar receiver, shown in FIG. 3, through respective antennas A and B.

Referring now to FIG. 3, the received vector signals $E_A$ and $E_B$ are simultaneously coupled to a well known waveguide hybrid comparator circuit 10 which is adapted to produce the respective sum and difference of the vector quantities $E_A$ and $E_B$. These relationships may be expressed as $E_A + E_B = \Sigma$, hereinafter referred to as the sum vector signal, and $E_A - E_B = \Delta$, hereinafter referred to as the difference vector signal. It is to be understood, of course, that the sum vector signal $\Sigma$ is proportional in magnitude to and has the sense of the algebraic sum of the amplitude of the signals in antenna feeds A and B, and that the difference vector signal $\Delta$ is proportional in magnitude to and has the sense of the algebraic difference between the amplitude of the signals in antenna feeds A and B. The sum vector signal $\Sigma$ and the difference vector signal $\Delta$ are each heterodyned with the output from a local oscillator 12 in respective mixer circuits 14 and 16 to produce respective sum and difference IF vector signals. The sum IF vector signal output from mixer circuit 14 and the difference IF vector signal output from mixer circuit 16 are applied to respective amplifiers 18 and 20 labeled $\Sigma$IF and $\Delta$IF, the respective outputs of which are combined in a first adder circuit 22 and in a first subtractor circuit 24. Hence, the IF output of adder circuit 22 is the vector sum $$\Sigma + \Delta = (E_A + E_B) + (E_A - E_B) = 2E_A \quad (3)$$

and the IF output from subtractor circuit 24 is the vector difference $$\Sigma - \Delta = (E_A + E_B) - (E_A - E_B) = 2E_B \quad (4)$$

It is to be understood, of course, that $\Sigma$IF and $\Delta$IF signals remain dependent in magnitude and sense upon their parent signals. Thus, the discrete IF outputs from adder circuit 22 and subtractor circuit 24 provide signal vectors directly proportional in amplitude to antenna signals $E_A$ and $E_B$, the original antenna signals, so that, in effect, adder circuit 22 and subtractor circuit 24 serve to reconstitute the original antenna output vector signals.

Such adder and subtractor circuits are so well known to the art that no further description thereof is believed necessary. If it is to be assumed that there has been no distortion of the vector signals at any point in the frequency conversion and amplification process, then the IF phase angle between the amplified $E_A$ and $E_B$ vectors will be the same as the original antenna signals.

The IF sum and difference signals $2E_A$ and $2E_B$ are applied to respective add and difference rectifiers 26 and 28, the outputs of which provide the absolute voltage value of the IF vector signal outputs from adder circuit 22 and subtractor circuit 24, respectively. The respective absolute voltage outputs from rectifiers 26 and 28 are combined in a second adder circuit 30 and a second subtractor circuit 32 to produce respective voltage signals equal to the arithmetic sum and arithmetic difference of the absolute voltages derived from rectifiers 26 and 28. As shown, the arithmetic sum direct-current voltage, is applied as one input to a differential amplifier or comparison circuit 34 where it is compared with a reference direct-current voltage C applied to the other input of comparison circuit 34. The output of comparison circuit 34 is adapted to provide a direct-current signal voltage proportional to the difference between the arithmetic sum signal voltage applied from second adder circuit 30 and the reference voltage C. The output of comparison circuit 34 is applied to the input of an automatic gain control circuit 36, the output of which is applied to both the $\Sigma$IF amplifier 18 and the $\Delta$IF amplifier 20. If G is the total gain from the output of antennas A and B to the outputs of adder circuit 22 and subtractor circuit 24, that is, to where the original antenna signals are reconstructed, then the arithmetic sum from adder circuit 30 may be expressed as $[|E_A| + |E_B|]G$. With this input applied to automatic gain control circuit 36 through comparison circuit 34, as shown, then the effect of the control signal from automatic gain control circuit 36 will be such that the outputs of $\Sigma$IF amplifier 18 and the $\Delta$IF amplifier 20 will maintain $$[|E_A| + |E_B|]G \cong C \quad (5)$$

The arithmetic difference signal $[|E_A| - |E_B|]G$ is derived from subtractor circuit 32 to provide the elevation error correction signal (Elevation ECS). The discrete vector signal outputs of adder circuit 22 and subtractor circuit 24 are also applied through respective conventional limiters 38 and 40 to a phase detector circuit 42, the output of which provide the azimuth ESC.

To show that the elevation ECS is independent of the azimuth axis, let it be assumed that the antenna vector signals $E_A$ and $E_B$ received by the antenna are as defined in Equations 1 and 2. It can be seen that if the absolute magnitude $|E_A|$ and $|E_B|$ are taken, then the magnitudes $|E_A|$ and $|E_B|$ will not depend on the the relative phase of the vector signals $E_A$ and $E_B$. Also, the magnitude function of $\alpha$, the azimuth angle, is the same for both signals. Thus, if the ratio of the sum and difference of these absolute magnitudes is taken, then the amplitude function may be cancelled out. As explained above, the output of the arithmetic difference circuit 32 is $(|E_A| - |E_B|)G$ and since $$G \text{ from Equation } 5 \cong \frac{C}{|E_A| + |E_B|}$$

it can be seen that $$(|E_A| - |E_B|)G = \frac{|E_A| - |E_B|}{|E_A| + |E_B|} C \quad (6)$$

Now, with the values of $E_A$ and $E_B$ as derived from Equations 1 and 2, the ratio of the sum and difference of the absolute magnitudes shown in Equation 6 may be expressed as $$\frac{|E_A| - |E_B|}{|E_A| + |E_B|} C = \frac{\left| \frac{E_r}{\sqrt{2}} F(\alpha/2, \epsilon, \epsilon_b) f(\epsilon - \epsilon_b) e^{-j\alpha/2} \right| - \left| \frac{E_r}{\sqrt{2}} F(\alpha/2, \epsilon, \epsilon_b) f(\epsilon + \epsilon_b) e^{j\alpha/2} \right|}{\left| \frac{E_r}{\sqrt{2}} F(\alpha/2, \epsilon, \epsilon_b) f(\epsilon - \epsilon_b) e^{-j\alpha/2} \right| + \left| \frac{E_r}{\sqrt{2}} F(\alpha/2, \epsilon, \epsilon_b) f(\epsilon + \epsilon_b) e^{j\alpha/2} \right|} C \quad (7)$$

and, since the $$\frac{E_r}{\sqrt{2}} F(\alpha/2, \epsilon, \epsilon_b)$$

terms can be cancelled out, we have $$\frac{|E_A|-|E_B|}{|E_A|+|E_B|} C = \frac{|f(\epsilon-\epsilon_b)|-|f(\epsilon+\epsilon_b)|}{|f(\epsilon-\epsilon_b)|+|f(\epsilon+\epsilon_b)|} C$$

$$= (|E_A|-|E_B|) G = \text{ECS voltage} \quad (8)$$

Thus, the output from arithmetic difference circuit 32, $[|E_A|-|E_B|]G$, is equal to the ECS voltage and it is obvious from Equation 8, that for a given beam squint $\epsilon_b$, the ECS amplitude is independent of azimuth and depends only on the elevation angle $\epsilon$. Since the azimuth ECS is derived from the phase comparison of the $E_A$ and $E_B$ vectors in phase detector 42, it is obvious that the azimuth axis ECS ratio is independent of the elevation axis.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a monopulse receiver system of the combination amplitude-phase comparison type wherein the radiation patterns from two antennas are aligned in a horizontal plane but displaced relatively in a vertical plane, means for deriving an elevation error correction signal and an azimuth error correction signal, said means comprising: means responsive to the combined antenna output signals for producing respective sum and difference vector signals, means for converting said sum and difference vector signals to respective sum and difference vector signals at a prescribed intermediate frequency, discrete means for respectively amplifying the sum and difference vector IF signals, discrete means for respectively adding and subtracting the amplified sum and amplified difference vector IF signals whereby the respective antenna output signals are individually reconstructed, the voltage gain from said antenna outputs to the respective outputs of said adding and subtracting means being a prescribed value, means responsive to the output of said adding means for deriving the absolute voltage value of the added sum and difference vector IF signals, means responsive to the output of said subtracting means for deriving the absolute voltage value of the subtracted sum and difference vector IF signals, discrete means for respectively deriving the arithmetic sum voltage and arithmetic difference voltage of said absolute voltages, means in circuit with said discrete amplifying means and responsive to the difference between a prescribed reference voltage and said arithmetic sum voltage whereby said arithmetic sum voltage is maintained substantially equal to said reference voltage, the arithmetic difference voltage being the elevation error correction signal, and means for detecting the difference in phase between the vector IF outputs of said adding means and said subtracting means to produce the azimuth error correction signal.

2. In a monopulse receiver system of the combination amplitude-phase comparison type wherein the radiation pattern from two antennas are aligned in a horizontal plane but displaced relatively in a vertical plane, means for deriving an elevation error correction signal and an azimuth error correction signal, said means comprising: means responsive to the combined antenna output signals for producing respective sum and difference vector signals, means for converting said sum and difference vector signals to discrete sum and difference vector signals at a prescribed intermediate frequency, discrete amplifiers for amplifying the respective sum and difference IF vector signals, discrete means for adding said sum and difference IF vector signals and for subtracting said sum and difference IF vector signals whereby they are produced discrete vector voltages proportional respectively to each of the output signals from said antennas, the voltage gain from said antenna outputs to the respective outputs of said adding and said subtracting means being a prescribed value, a first and second rectifier responsive respectively to the output of said adding means and the output of said subtracting means for deriving the absolute voltage of the added sum and difference IF vector signals, and the absolute voltage of the subtracted sum and difference IF vector signals, discrete means for respectively producing the arithmetic sum of said absolute voltages and the arithmetic difference of said absolute voltages, means in circuit with each of said amplifiers and responsive to the difference between a prescribed reference voltage and the sum of said absolute voltages whereby the sum of said absolute voltages is maintained substantially equal to the reference voltage, the arithmetic difference between said absolute voltages being the elevation correction signal, and means for detecting the difference in phase between the vector IF outputs of said adding means and said subtracting means to produce the azimuth error correction signal.

3. In a monopulse receiver system of the combination amplitude-phase comparison type wherein the radiation patterns from two antennas are aligned in a horizontal plane but displaced relatively in a vertical plane, means for deriving an elevation error correction signal and an azimuth error correction signal, said means comprising: means responsive to the combined output signals of said antennas for producing respective sum and difference vector signals, means for converting said sum and difference vector signals to discrete sum and difference vector signals at a prescribed intermediate frequency, discrete amplifiers for amplifying the respective sum and difference IF vector signals, discrete means for adding said sum and difference IF vector signals and for subtracting said sum and difference IF vector signals whereby there are produced discrete vector voltages proportional respectively to each of the output signals from said antennas, the voltage gain from said antenna outputs to the respective outputs of said adding and said subtracting means being a prescribed value, means responsive to the respective outputs of said adding means and said subtracting means for deriving the absolute voltage value of the subtracted sum and difference vector IF signals, discrete means for respectively deriving the arithmetic sum voltage and the arithmetic difference voltage of said absolute voltage values, a comparison circuit responsive to the difference between a prescribed reference voltage and said arithmetic sum voltage for producing a control signal, an automatic gain control circuit having a common output connection to the inputs of said discrete amplifiers and having its input responsive to said control signal whereby the said arithmetic sum voltage is maintained substantially equal to said reference voltage, the arithmetic difference between said absolute voltages being the elevation correction signal, and means for detecting the difference in phase between the vector IF outputs of said adding means and said subtracting means to produce the azimuth error correction signal.

4. The system in accordance with claim 3 wherein each of the absolute voltage value deriving means comprises a rectifier.

References Cited in the file of this patent

UNITED STATES PATENTS

| | | |
|---|---|---|
| 2,682,656 | Phillips | June 29, 1954 |
| 2,687,520 | Fox et al. | Aug. 24, 1954 |
| 2,817,835 | Worthington | Dec. 24, 1957 |